(12) United States Patent
Harper (10) Patent No.: US 6,640,688 B1
(45) Date of Patent: Nov. 4, 2003

(54) ACTUATOR ASSEMBLY

(75) Inventor: James D. Harper, Hoover, AL (US)

(73) Assignee: Tyco Flow Control, Inc., Houston, TX (US)

( * ) Notice: Subject to any disclaimer, the term of this patent is extended or adjusted under 35 U.S.C. 154(b) by 0 days.

(21) Appl. No.: 09/867,979

(22) Filed: May 30, 2001

Related U.S. Application Data (63) Continuation-in-part of application No. 09/648,328, filed on Aug. 25, 2000.

(51) Int. Cl.[7] ............................................... F15B 15/26
(52) U.S. Cl. ............................. 92/23; 92/129; 92/140
(58) Field of Search ........................ 92/23, 15, 129, 92/140

(56) References Cited

U.S. PATENT DOCUMENTS

| | | |
|---|---|---|
| 108,426 A | 10/1870 | Young et al. |
| 872,501 A | 12/1907 | Davis |
| 1,081,817 A | 12/1913 | Deming |
| 1,618,775 A | 2/1927 | Neuls |
| 1,922,874 A | 8/1933 | Tymstra |
| 1,955,222 A | 4/1934 | Bowdry, Jr. |
| 1,991,504 A | 2/1935 | Hopkins |
| 2,439,113 A | 4/1948 | Thiieme |
| 2,442,306 A | 5/1948 | McCormick |
| 2,633,141 A | 3/1953 | Russell |
| 2,665,712 A | 1/1954 | Pratt |
| 2,769,573 A | 11/1956 | Miller |
| 3,051,433 A | 8/1962 | Dale et al. |
| 3,090,218 A | 5/1963 | Birkness |
| 3,146,681 A | 9/1964 | Sheesley |
| 3,448,762 A | 6/1969 | Schmitt |
| 3,507,192 A | 4/1970 | Stokke |
| 3,523,675 A | 8/1970 | Grove et al. |
| 3,605,567 A | 9/1971 | Cooper |
| 3,613,512 A | 10/1971 | Taft |
| 3,650,506 A | 3/1972 | Bruton |
| 3,672,262 A * | 6/1972 | Karr ........................... 92/140 |
| 3,797,804 A | 3/1974 | Ashbaugh |
| 4,103,864 A | 8/1978 | Hagendorn |
| 4,187,870 A | 2/1980 | Akkerman |
| 4,274,438 A | 6/1981 | La Coste |
| 4,355,566 A | 10/1982 | Kaji |
| 4,426,063 A | 1/1984 | Bormioli |
| 4,463,776 A | 8/1984 | Hewlett |
| 4,564,169 A | 1/1986 | Nordlund |
| 4,651,627 A | 3/1987 | Stewart |
| 4,716,815 A | 1/1988 | Stewart |
| 4,949,936 A | 8/1990 | Messina |
| 4,971,289 A | 11/1990 | Pietras |
| 5,014,598 A | 5/1991 | Champagne |
| 5,046,523 A | 9/1991 | Horhota |
| 5,074,134 A | 12/1991 | Wheadon |
| 5,102,093 A | 4/1992 | Van Dyke |
| 5,109,692 A | 5/1992 | Fitzgerald |
| 5,116,018 A | 5/1992 | Friemoth et al. |
| 5,139,230 A | 8/1992 | Lester |
| 5,190,263 A | 3/1993 | Roberts |
| 5,205,317 A | 4/1993 | Neuerberg et al. |

(List continued on next page.)

Primary Examiner—Edward K. Look
Assistant Examiner—Michael Leslie
(74) Attorney, Agent, or Firm—Browning Bushman P.C.

(57) ABSTRACT

An actuator assembly comprising at least one prime mover, a shaft having a first end and a second end, the shaft being operatively connected to the prime mover for reciprocal movement, a frame, the shaft being reciprocably movable in the frame, and linkage attached to the frame and operatively connected to the shaft, the linkage being movable between a first position and a second position in response to reciprocal movement of the shaft and a selectively engageable stroke-limiting assembly operatively connected to the shaft for controlling movement of the shaft, either by preventing any movement of the shaft or limiting its stroke a predetermined amount.

66 Claims, 8 Drawing Sheets

U.S. PATENT DOCUMENTS

| | | |
|---|---|---|
| 5,236,172 A | 8/1993 | Friemoth et al. |
| 5,329,959 A | 7/1994 | Owen et al. |
| 5,348,271 A | 9/1994 | Owen et al. |
| 5,357,847 A | 10/1994 | Stewart |
| 5,385,167 A | 1/1995 | Owen et al. |
| 5,431,182 A | 7/1995 | Brown |
| 5,469,737 A | 11/1995 | Smith et al. |
| 5,654,885 A | 8/1997 | Mayhew et al. |
| 5,665,898 A | 9/1997 | Smith et al. |
| 5,747,697 A | 5/1998 | Johnson et al. |
| 5,772,286 A | 6/1998 | Jordan |
| 5,842,404 A | 12/1998 | Isern et al. |
| 6,044,860 A | 4/2000 | Neu |
| 6,082,393 A | 7/2000 | Tye |
| 6,089,269 A | 7/2000 | Essam |
| 6,089,531 A | 7/2000 | Young |
| 6,131,609 A | 10/2000 | Metso et al. |
| 6,138,985 A | 10/2000 | Chronister |
| 6,176,247 B1 | 1/2001 | Winchcomb et al. |
| 6,186,167 B1 | 2/2001 | Grumstrup et al. |

\* cited by examiner

ACTUATOR ASSEMBLY

CROSS-REFERENCE TO RELATED APPLICATIONS

This application is a continuation-in-part of U.S. application Ser. No. 09/648,328, filed Aug. 25, 2000.

BACKGROUND OF THE INVENTION

1. Field of the Invention

The present invention relates to actuator assemblies for use in moving a driven member, such as, for example, for rotating the stem of a valve. In particular, the present invention relates to actuator assemblies that are (a) lockable to prevent inadvertent movement of the driven member and (b) operative to permit a predetermined, limited movement of the driven member.

2. Description of the Prior Art

Valves, such as quarter-turn valves, e.g., butterfly valves, ball valves, etc., are commonly used to control fluid flow through flow conduits. Such valves commonly include a rotatable valve element disposed in a valve body, the valve element being rotatable between open and closed positions. Typically, there is a stem connected to the valve element that can be rotated to thereby rotate the valve element. Such rotation can be effected manually, but more frequently, the valve stem is connected to an actuator, which can be hydraulic, pneumatic, mechanical, electrical, etc.

In many instances, by governmental regulation or otherwise, it is desirable to provide security in the form of a locking mechanism to lock a valve in either an open or closed position to prevent unauthorized and unintended operation of the valve. For example, in a case where maintenance is being performed in a system of which the valve forms a part, it is desirable to lock the valve in the closed position so that the maintenance can be carried on safely and without the likelihood that the valve will be inadvertently opened. In this regard, it is also desirable that any valve-locking mechanism include an indicator that informs an observer of the position of the valve—i.e., opened or closed. In the aforementioned Continuation-in-Part Application Ser. No. 09/648,328, incorporated herein by reference for all purposes, there is disclosed an actuator assembly, which is lockable, to prevent inadvertent movement of a driven member, e.g., the rotatable stem of a valve.

Additionally, it may be desirable to test a valve's operability, such as in circumstances wherein a valve is called upon to function only rarely. An example may be in the case of an emergency shutdown valve (ESV), whose typical function, in an emergency, is to move to a fully closed position. Usually, ESVs are in an open position and remain in that condition for extended periods of time. Because the ESVs remain in an open position for retracted periods of time, it is possible for the valve element to become frozen in that position due to corrosion, buildup of process media, or the like. Even if not in the frozen state, such corrosion or buildup of process media may dramatically increase the time and torque necessary to move the valve element to the closed position. In either situation—i.e., whether the valve element be completely frozen and thereby require greater output torque than can be delivered by the actuator, or partially frozen such that the time required to close the valve is unacceptably long—there is a potential for loss of life and property. While it is possible to periodically close an ESV to test its operability, this requires disruption of the process in which the ESV is operating. Accordingly, it would be desirable to have an actuator assembly that could "exercise" the valve—i.e., test its operability—by moving the valve element a limited, predetermined amount, provision being made such that the valve element cannot be totally moved to any extreme, generally closed, position during the exercising procedure.

SUMMARY OF THE INVENTION

It is therefore an object of the present invention to provide an actuator assembly that can selectively control the degree of movement of a driven member to which the actuator assembly is attached.

It is therefore an object of the present invention to provide a selectively lockable actuator assembly used to effect movement of a driven member.

Another object of the present invention is to provide a selectively lockable actuator assembly for use with a valve, such as a quarter-turn valve.

Another object of the present invention is to provide a selectively lockable actuator assembly, which provides an indication of the condition, e.g., position, of the driven member to which the actuator assembly is attached.

Still a further object of the present invention is to provide an actuator assembly that permits a predetermined, limited movement of a driven member.

Still a further object of the present invention is to provide an actuator assembly that is operative to permit a predetermined, limited movement of the valve element of an ESV or the like.

The above and other objects of the present invention will become apparent from the drawings, the description given herein, and the appended claims.

In one embodiment, the actuator assembly of the present invention includes a prime mover and a shaft having a first end and a second end, the shaft being operatively connected to the prime mover for reciprocal movement. The actuator assembly further includes a frame, the shaft being reciprocably movable in the frame. A linkage is attached to the frame and operatively connected to the shaft, the linkage being movable between a first position and a second position in response to reciprocal movement of the shaft. There is a selectively engageable stroke-limiting assembly operatively connected to the shaft for controlling movement of the shaft when the stroke-limiting assembly is engaged.

DESCRIPTION OF THE PREFERRED EMBODIMENTS

While the present invention will be described with respect to an actuator assembly for use in conjunction with a valve, such as a quarter-turn valve, it is to be understood that the actuator assembly of the present invention can be used in conjunction with any apparatus having a driven member, such as a shaft, stem, or the like, that is movable, either by rotation or linear motion, between first and second positions. As used herein, the term "stroke-limiting" encompasses both preventing movement of the shaft forming part of the actuator assembly of the present invention or permitting limited, predetermined movement of the shaft forming part of the actuator assembly of the present invention.

With reference to FIGS. 1–7, there is shown one embodiment of the actuator assembly of the present invention. The actuator assembly, shown generally as 10, comprises a prime mover 12 in the form of a fluid-activated actuator or motor having a cylindrical housing 14 and a cylindrical piston 16 slidably mounted in housing 14, piston 16 being movable in response to fluid pressure alternately forced into and out of ports 18 and 20 from a suitable fluid pressure source (not shown). As is conventional, actuator assembly 10 is provided with an adjustable stop 22 to limit travel of piston 16.

Figure 1:
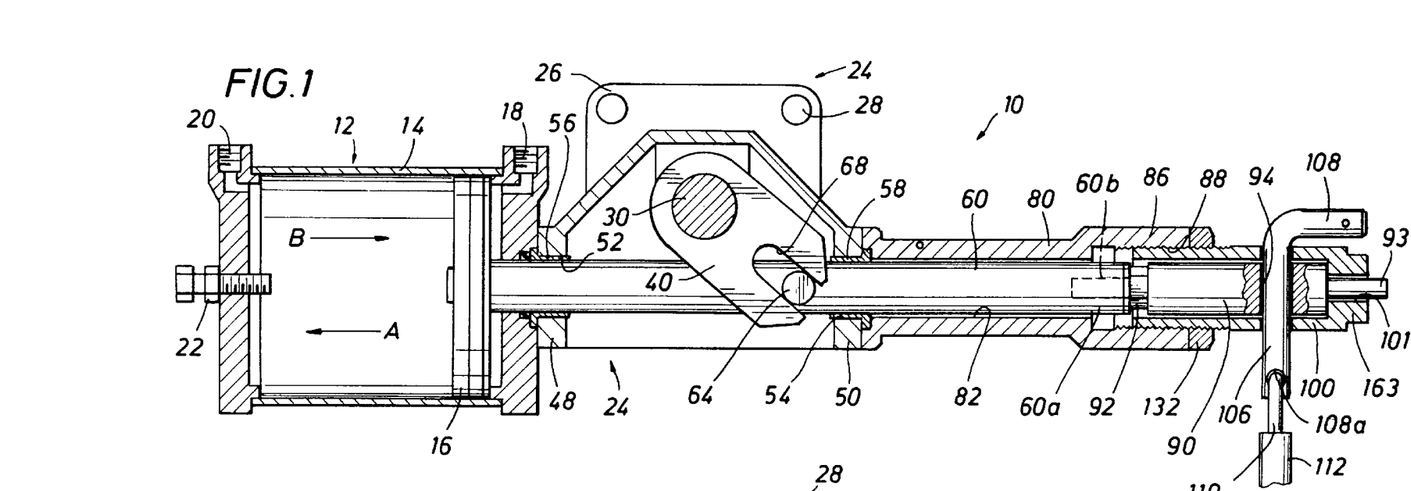
FIG. 1 is an elevational view, partly in section, showing one embodiment of the actuator assembly of the present invention with the actuator assembly in a first position.
Figure 2:
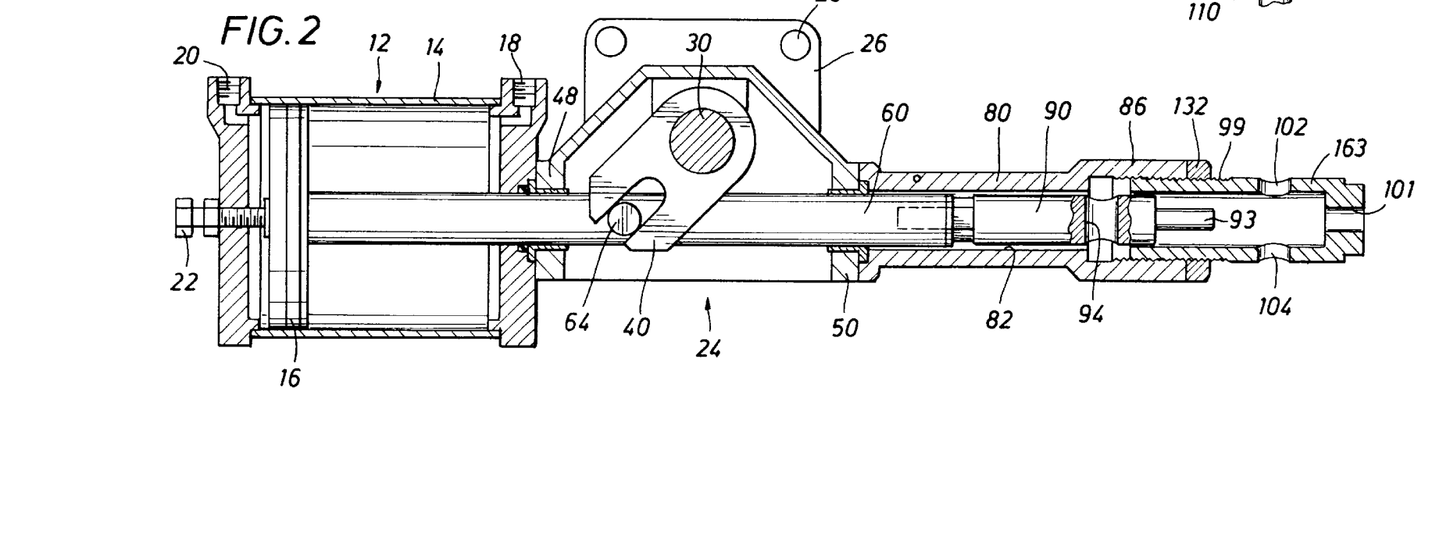
FIG. 2 is a view similar to FIG. 1 showing the actuator assembly in a second position.

Prime mover 12 is connected to a frame, shown generally as 24, frame 24 including a flange 26 having holes 28 for securing to the body of a valve or other apparatus by means of bolts (not shown). Rotatably journaled in frame 24 in the well-known manner is a driving shaft 30, shaft 30 being journaled in a thrust plate 32 secured to frame 24 by means of bolts 34. Shaft 30 has one terminal end portion 36 that is square in cross-section for a purpose hereinafter described. The opposite, terminal end of driving shaft 30 is covered with an indicator cap 38, indicator cap 38 rotating with shaft 30 and indicating the position of shaft 30 and hence a driven member connected to shaft 30. Secured to shaft 30 in a well-known manner is a yoke assembly 39, yoke assembly 39 having an upper yoke piece 40 and a lower yoke piece 42 interconnected by a yoke web 44. Frame 24 includes a first end wall 48 and a second end wall 50 provided with bores 52 and 54, respectively. Disposed in bores 52 and 54 are bearings 56 and 58, respectively. A cylindrical shaft 60 is slidably mounted in bearings 56 and 58 such that shaft 60 can reciprocate back and forth through first and second end walls 48 and 50, respectively. Extending through a bore in, and secured to, shaft 60 is a drive pin 62, drive pin 62 having a first portion 64 and a second portion 66, first portion 64 being received in a slot 68 in yoke piece 40, second portion 66 being received in a registering slot in yoke piece 38. It will thus be appreciated that if shaft 60 is reciprocated through end walls 48 and 50, yoke assembly 38 will be moved from a first position, as shown in FIG. 1, to a second position, as shown in FIG. 2, with concomitant rotation of shaft 30. Accordingly, when fluid pressure is supplied to prime mover 12 via port 18, piston 16 will be caused to move in the direction of arrow A until it reaches stop 22, as shown in FIG. 2. Conversely, by application of fluid pressure through port 20, piston 16 will move in the direction of arrow B, and the actuator assembly 10 will be returned to the position shown in FIG. 1. As will be understood, this reciprocal movement of shaft 60 will be translated into rotational movement of shaft 30, which will result in rotation of a driven member operatively attached in a suitable manner to shaft 30.

Figures 5, 6, 7:
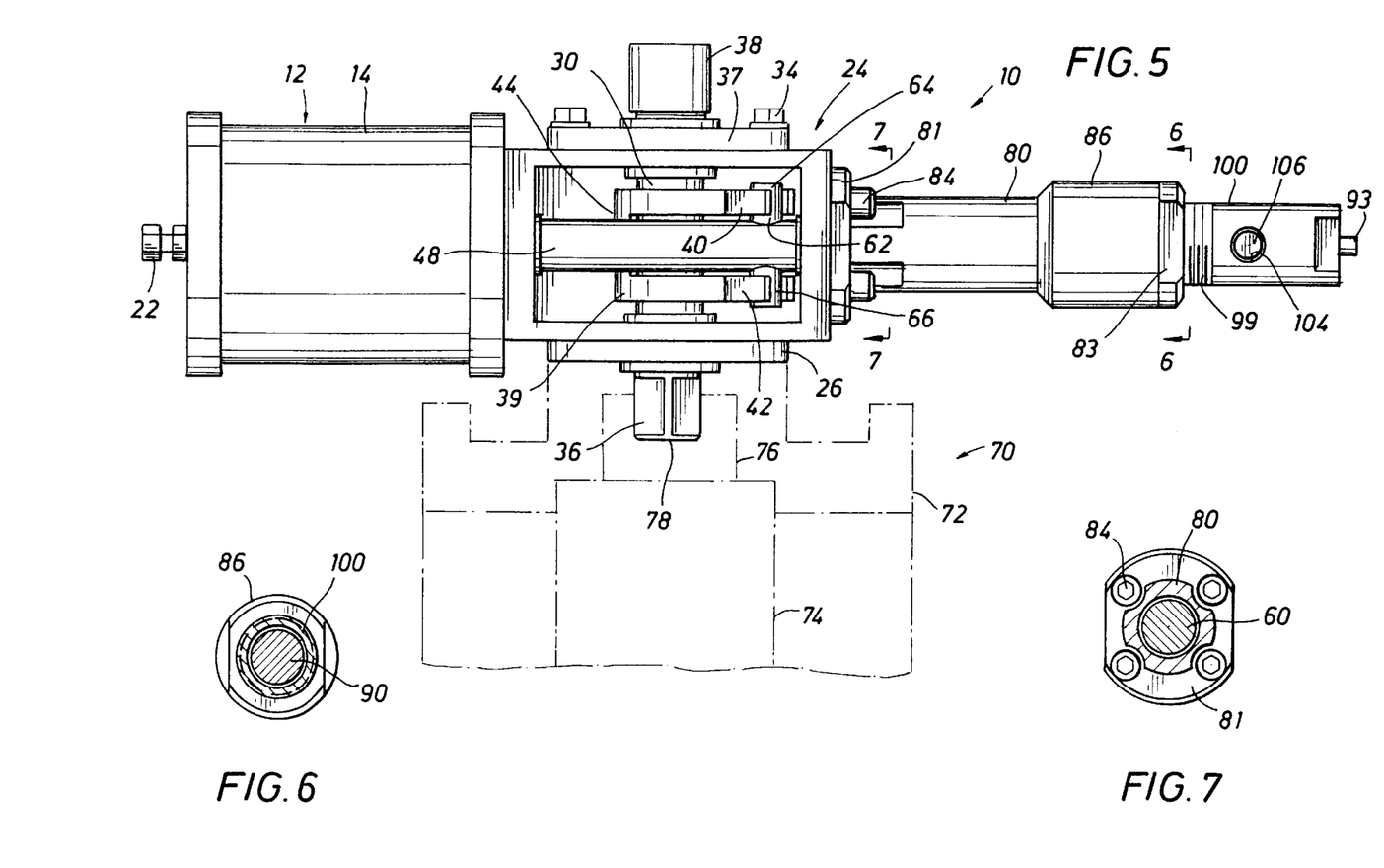
FIG. 5 is an elevational view of the actuator assembly shown in FIG. 1 being mounted on a valve shown in phantom.
FIG. 6 is a cross-sectional view taken along the lines 6—6 of FIG. 5.
FIG. 7 is a cross-sectional view taken along the lines 7—7 of FIG. 5.

With reference now to FIG. 5, the actuator assembly 10 is being shown as mounted to a valve shown in phantom as 70, valve 70 having a valve body shown in phantom as 72, a valve element shown in phantom as 74 and that is rotatable in valve body 72 to open and close valve 70, and a valve stem shown in phantom as 76, valve stem 70 being connected to valve element 74 in the well-known manner. As noted above, portion 36 of shaft 30 is square in cross-section and is received in a complementary-shaped socket 78 in valve stem 76. It will thus be appreciated that as the actuator assembly 10 moves from the position shown in FIG. 1 to the position shown in FIG. 2, valve element 74 will be rotated in valve body 72 to permit opening, closing, or throttling of valve 70. While portion 36 of driving shaft 30 is shown as being square in cross-section, it is to be understood that it could have any configuration that would allow it to be keyed to a driven member—i.e., a valve stem—such that the driven member would rotate with the driving shaft 30. It is only necessary that the driving shaft 30 be keyed or somehow connected to the driven member such that movement of the driving shaft 30, be it rotation or linear, is transferred to the driven member.

As noted above, while in the embodiment of the invention just described the actuator assembly translates linear motion into rotational motion, it could be used as well to translate the linear motion of shaft 60 to a linear motion of the yoke assembly 38 or some other appropriate linkage connected to shaft 60; i.e., shaft 30 or some other suitable member connected to the appropriate linkage could serve to linearly shuttle a driven member between first and second, linearly displaced positions.

With reference now to FIGS. 1–7, the construction and installation of one embodiment of the locking assembly of the present invention, forming part of the actuator assembly of the present invention, will be described. A guide 80 has a generally cylindrical bore 82 therethrough and is secured to end wall 50 of frame 24 by means of bolts 84 extending through a flange 51 formed on an end of guide 80. Guide 80 has an upset end portion 86 that has an internally threaded box 88 for a purpose hereinafter described. As can be seen, cylindrical bore 82 is concentric with pathways defined by bearings 58 and 56 whereby shaft 60 is free to move in cylindrical bore 82 in response to being driven by prime mover 12. End 60a of shaft 60 is provided with a threaded bore 60b, shown in phantom. A rod 90 has a reduced diameter, threaded portion 92 that is threadedly received in bore 60b in shaft 60. Rod 90 is also provided with an axially projecting protrusion 93 on the end opposite from reduced diameter, threaded portion 92 and a transverse bore 94. Threadedly received in the threaded box 88 of guide 80 is an externally threaded end 99 of a generally cylindrical housing 100 whereby housing 100 can be axially adjusted relative to guide 80. Housing 100 has an end wall 103 provided with an axially facing opening 101 and is further provided with diametrically opposed holes 102 and 104 that, when the actuator assembly 10 is in the position shown in FIG. 1, are in register with bore 94 in rod 90. Received in registering holes 102, 104 and bore 94 is a locking pin 106, locking pin 106 being generally L-shaped and having a head portion 108 that prevents locking pin 106 from passing through holes 102, 104 and bore 94. Locking pin 106 is also provided with a hole 108 for receipt of the shackle 110 of a padlock 112. To prevent locking pin 106 from being misplaced, it is tethered by means of a line 107 to guide 80.

It will thus be seen that with pin 106 in the position shown in FIG. 1, shaft 60 is prevented from movement, shaft 60 being connected to rod 90. Accordingly, even if fluid pressure is supplied through port 18 in prime mover 12, shaft 60 will not be allowed to move so as to force yoke assembly 38 from the position shown in FIG. 1 to the position shown in FIG. 2. Thus, assuming that the actuator assembly 10 is connected to a valve 70, as shown in FIG. 5, and the position shown in FIG. 1 represents the condition of the valve in the closed position, inadvertent opening of the valve will be prevented. As can be seen with reference to FIG. 2, when padlock 112 is removed from pin 106 and pin 106 is removed, application of fluid pressure through port 18 in prime mover 12 will result in linear movement of shaft 60 in the direction of arrow A, and assuming valve 70 is a 90° valve and the rotational travel of yoke assembly 38 corresponds to a 90° rotation of valve stem 76, valve 70 will then be in the open position.

As previously noted, rod 90 has an axially projecting protrusion 92, which, when the actuator assembly is in the position shown in FIG. 1, extends through an axially extending opening 101 formed in end wall 103 of housing 100, and projects outwardly therefrom. Projection 92 serves as an indicator to tell an observer the position of the driven member, e.g., the valve stem. Accordingly, with the actuator assembly in the position shown in FIG. 1, the observer would know that the valve is either in the open or closed position.

Figures 3, 4:
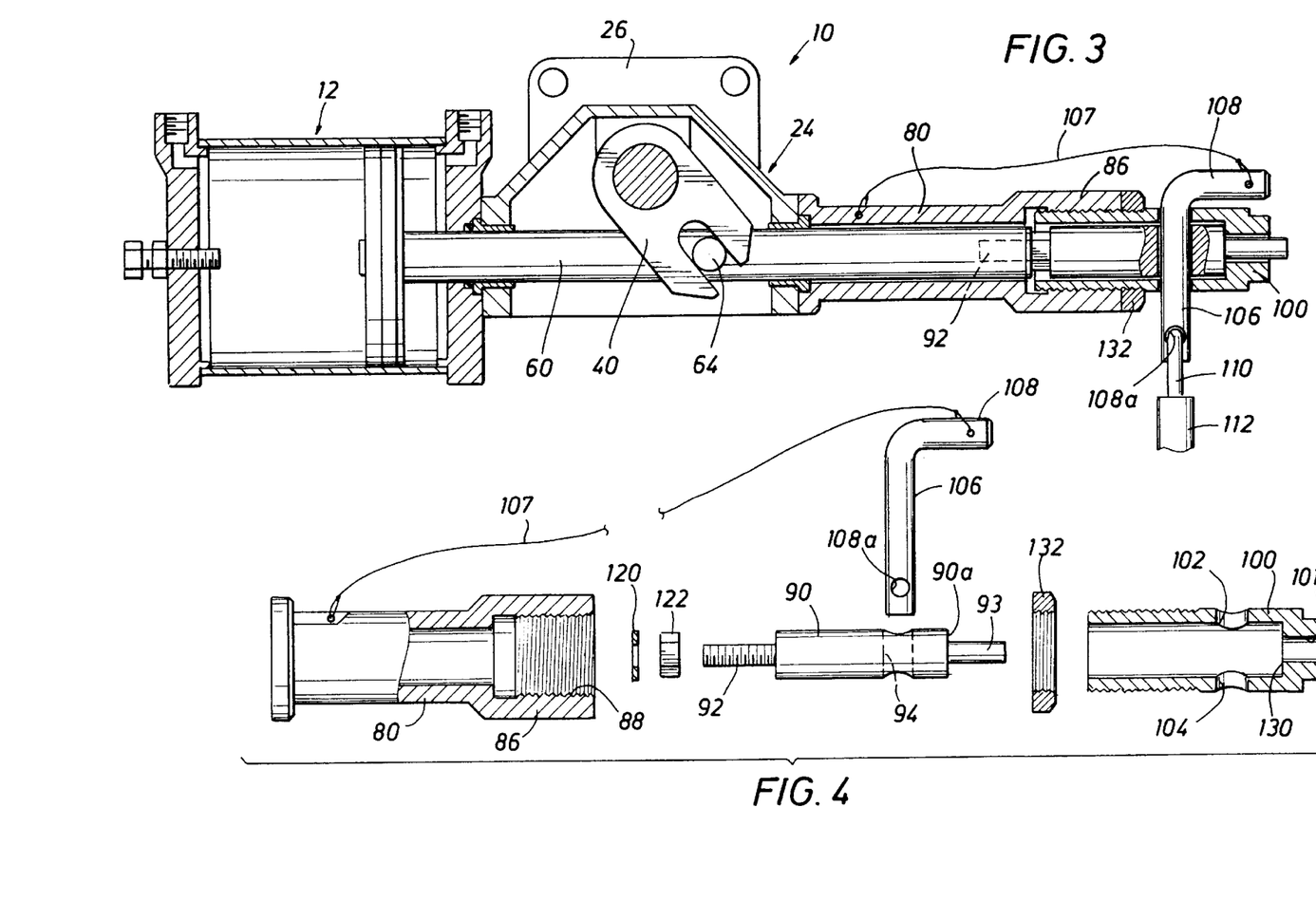
FIG. 3 is a view similar to FIG. 1 showing the actuator assembly in an adjusted position relative to FIG. 1.
FIG. 4 is an exploded view of one embodiment of the locking assembly used in the actuator assembly of the present invention.

Installation of the locking assembly in the actuator assembly 10 of the present invention can best be understood with reference to FIG. 4. To install the locking assembly, the threaded reduced diameter portion 92 of rod 90 would be threaded into bore 60b in the end of shaft 60 until rod 90 was bottomed out, locking washer 120 and locking nut 122 being used to prevent rod 90 from backing off shaft 60. Guide 80 would then be secured to frame 24, following which the threaded end 99 of housing 100 would be threaded into the threaded box 88 of guide 80. To this end, housing 100 is provided with wrench flats 83.

As best seen with reference to FIG. 4, rod 90 has a shoulder 90a, while the end wall 103 of housing 100 forms an axially facing, annularly extending abutment surface 130. With rod 90 secured to shaft 60 as described above, and with shaft 60 moved to the position shown in FIG. 3, housing 100 is rotated until holes 102 and 104 are in register with bore 94 in rod 90. At this point, shoulder 90a will abut surface 130. This will also allow locking pin 106 to be received in registering holes 102, 104 and bore 94. To securely position housing 100 relative to guide 80, lock nut 132 is tightened, ensuring that holes 102, 104 are maintained in register with bore 94. Lock nut also ensures that housing 100 will not be rotated so as to place holes 102, 104 out of register with bore 94.

It may be necessary from time to time to adjust the travel of shaft 60 to ensure, for example, that the valve element 74 is in proper engagement with the valve seat (not shown) when the actuator assembly 10 is being used with a valve 70. With the present invention, this can be easily accomplished simply by adjusting housing 100 into or out of guide 80. For example, comparing FIGS. 1 and 3, it can be seen that in FIG. 3, housing 100 has been threaded further into guide 80 than is the case in FIG. 1. Since shoulder 90a abuts surface 130, the result is to move rod 60 in the direction of arrow A such that piston 16 is now displaced further in the direction of arrow A in FIG. 3 than it is in FIG. 1. This also rotates driving shaft 30 from its position in FIG. 1 to a new portion corresponding to FIG. 3. Thus, a driven member 76 operatively attached to driving shaft 30 will be repositioned.

Figure 8:
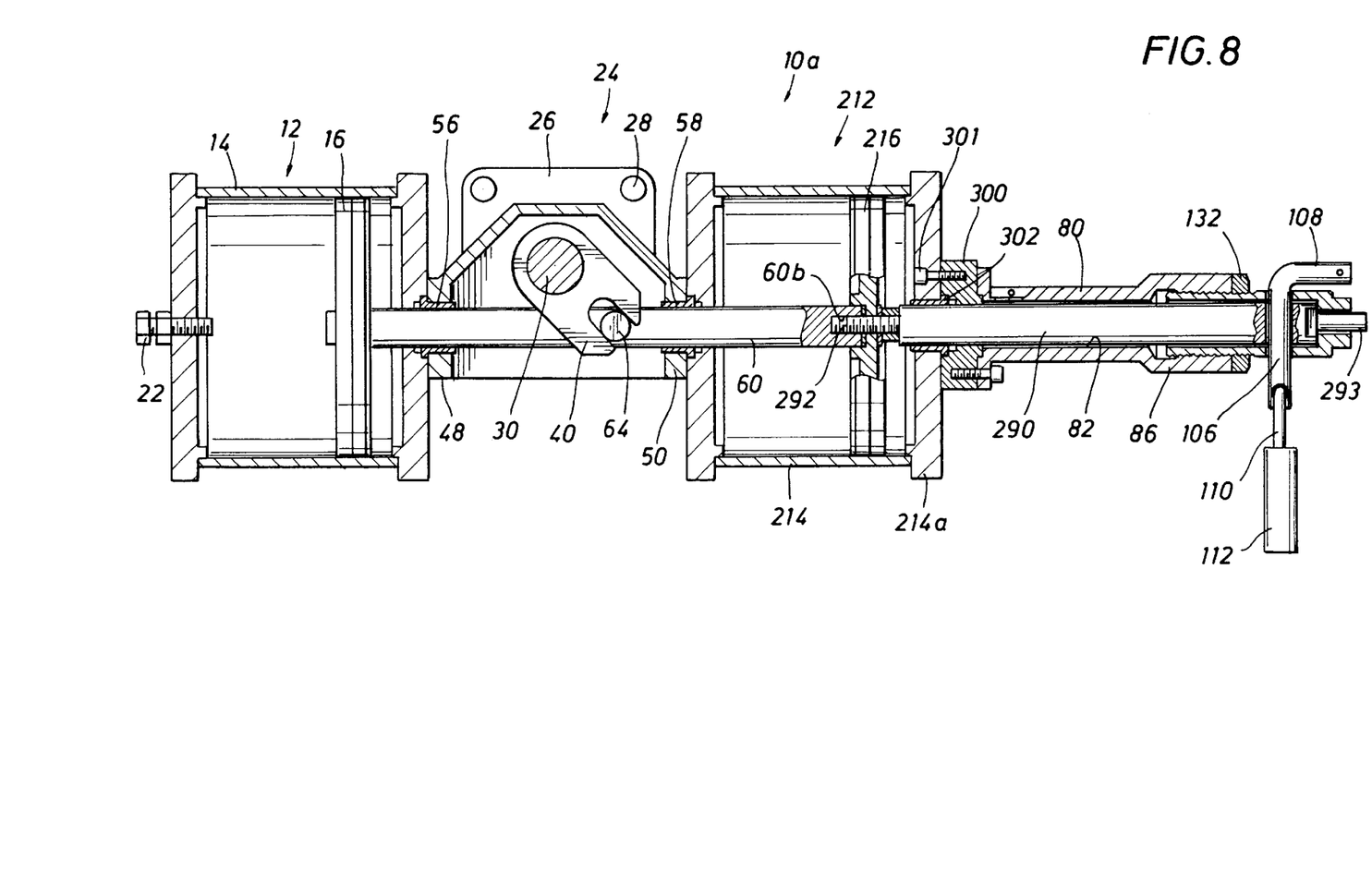
FIG. 8 is an elevational view, partly in section, of another embodiment of the actuator assembly of the present invention.

Reference is now made to FIG. 8 for another embodiment of the actuator assembly of the present invention. In the embodiment shown in FIG. 8, shown generally as 10a, there are two prime movers, prime mover 12 and prime mover 212, prime mover 212 basically having the same construction as described above with respect to prime mover 12; i.e., it is a fluid-actuated motor or actuator wherein fluid pressure moves piston 216 longitudinally back and forth through housing 214. Unlike the assembly shown in FIGS. 1–7, in actuator assembly 10a, shaft 60 is connected at both ends to prime movers, one end of shaft 60 being connected to prime mover 12, the other end of shaft 60 being connected to prime mover 212. Although not shown, it will be apparent that both prime movers 12 and 212 have ports, such as ports 18 and 20 shown in FIG. 1, for the ingress and egress of pressurized fluid to oscillate pistons 16 and 216 back and forth in their respective housings, which will reciprocate shaft 60, as described above.

Unlike actuator assembly 10 wherein guide 80 is connected to frame 24, in actuator assembly 10a, second prime mover 212 is disposed between and connected to frame 24 and guide 80. To this end, a boss 300 is connected by screws 302 to one end wall 214a of prime mover 212. Guide 80 is then connected to boss 300 in substantially the same manner as guide 80 is connected to frame 24, the embodiment shown in FIG. 1. Rod 290 has a reduced diameter, threaded portion 292 that is received in threaded bore 60b of shaft 60 in the same manner that reduced diameter, threaded portion 92 of rod 90 is received in threaded bore 60b, as shown in FIG. 1. As can be seen, threaded portion 292 extends through a bore in piston 216 to engage threaded bore 60b of shaft 60. A bearing 302 carried by end wall 214a slidably mounts rod 290, rod 290 and shaft 60 being generally concentrically aligned with one another.

It can thus be seen that the actuator assembly 10a shown in FIG. 8 operates in substantially the same manner as the actuator assembly 10 shown in FIGS. 1–3, with the exception, as noted above, that there are two prime movers used to reciprocate shaft 60, which in turn rotates driving shaft 30.

Figure 9:
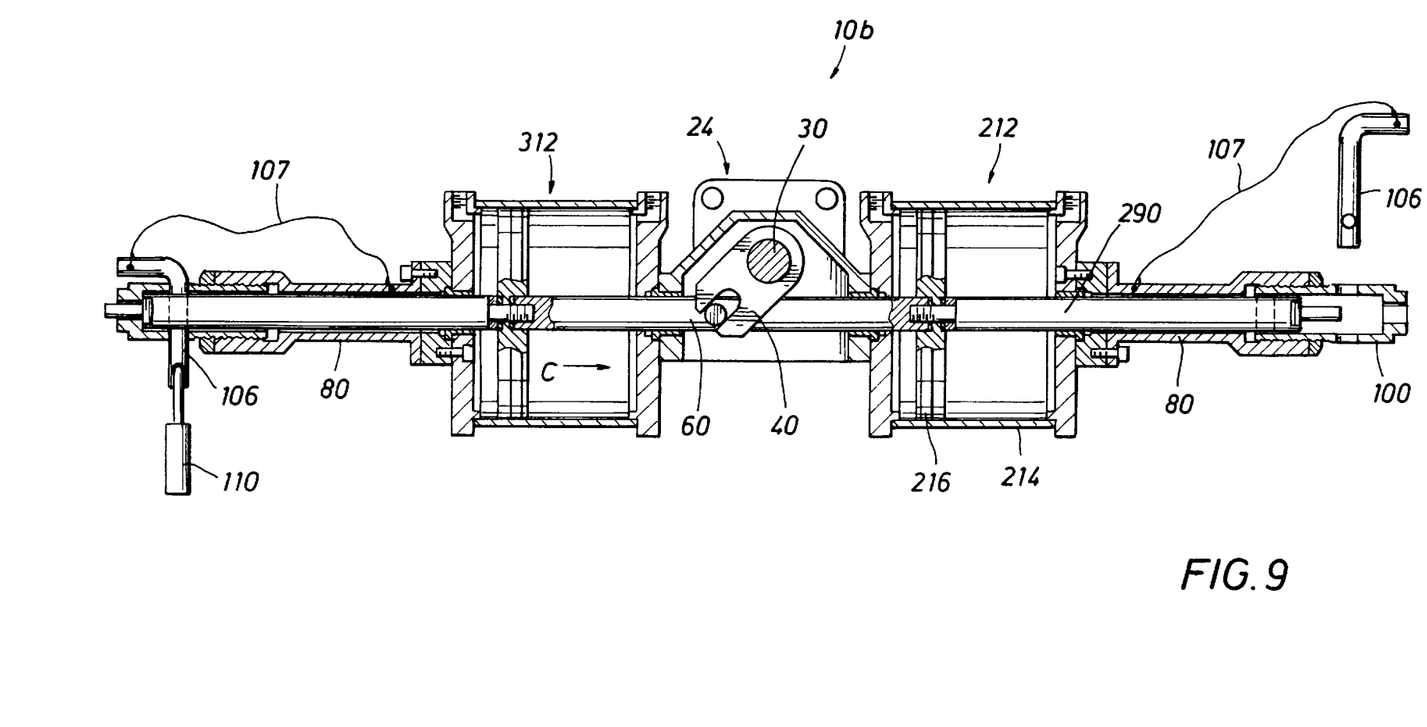
FIG. 9 is an elevational view, partly in section, of another embodiment of the actuator assembly of the present invention.

With reference now to FIG. 9, there is shown an embodiment of the present invention wherein there are two prime movers and two locking assemblies. As does actuator assembly 10a, actuator assembly 10b, shown in FIG. 9, has each end of shaft 60 connected to a prime mover, in this case prime mover 212, such as shown in FIG. 8, and prime mover 312. The connection between prime mover 312 and the shaft and between prime mover 312 and guide 80 is substantially as that described above with respect to the connection between prime mover 212, shaft 60, and guide 80 described above with respect to FIG. 8. With respect to actuator assembly 10b, it can be seen that rod 60 can be reciprocated in the same manner as described above with respect to the other embodiments by the ingress and egress of pressurized fluid into the prime movers 212, 312. However, unlike the previous embodiments wherein shaft 60 could be locked in only one predetermined position, with the actuator assembly of 10b, shaft 60 can be locked in two predetermined positions. Thus, and as can be seen with reference to FIG. 9, shaft 60, and hence the linkage comprised of yoke assembly 38 and driving shaft 30, can be locked in a position as shown in FIG. 9 by the insertion of the pin 106 into the locking assembly attached to prime mover 312. Alternatively, with no locking pins 106 in place, if pressure is applied to prime movers 212 and 312 to move the pistons in the direction of arrow C, the linkage comprised of yoke driving shaft 30 and yoke assembly 38 will be moved to the position shown in FIG. 1. Thus, if the position in FIG. 9 represents the valve in an open locked position, it will be apparent that the actuator assembly 10b also can be used to lock the valve in the closed position.

Figure 10:
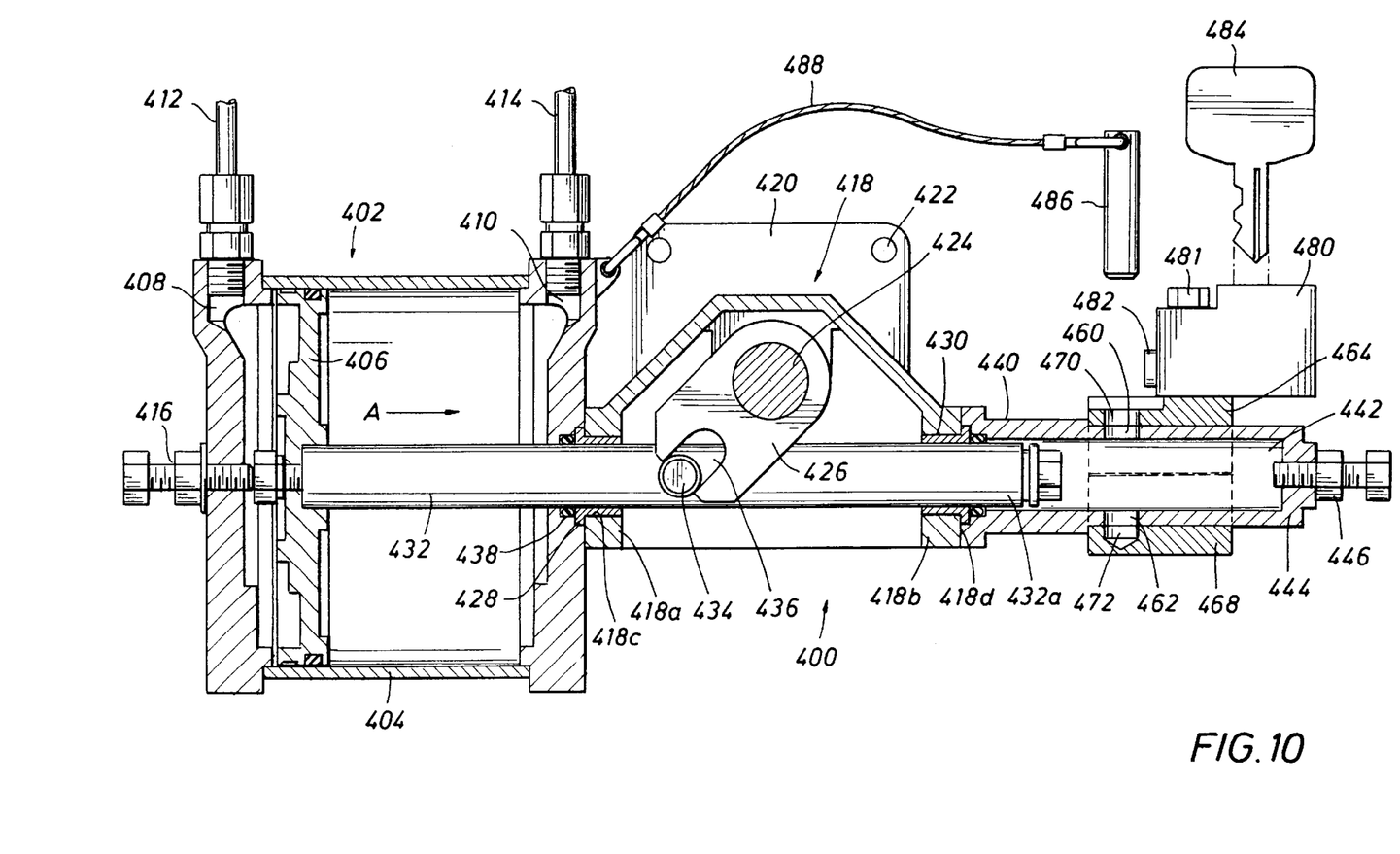
FIG. 10 is an elevational view, partly in section, showing another embodiment of the actuator assembly of the present invention used as a stroke-limiting device but with the stroke-limiting feature disengaged.
Figure 11:
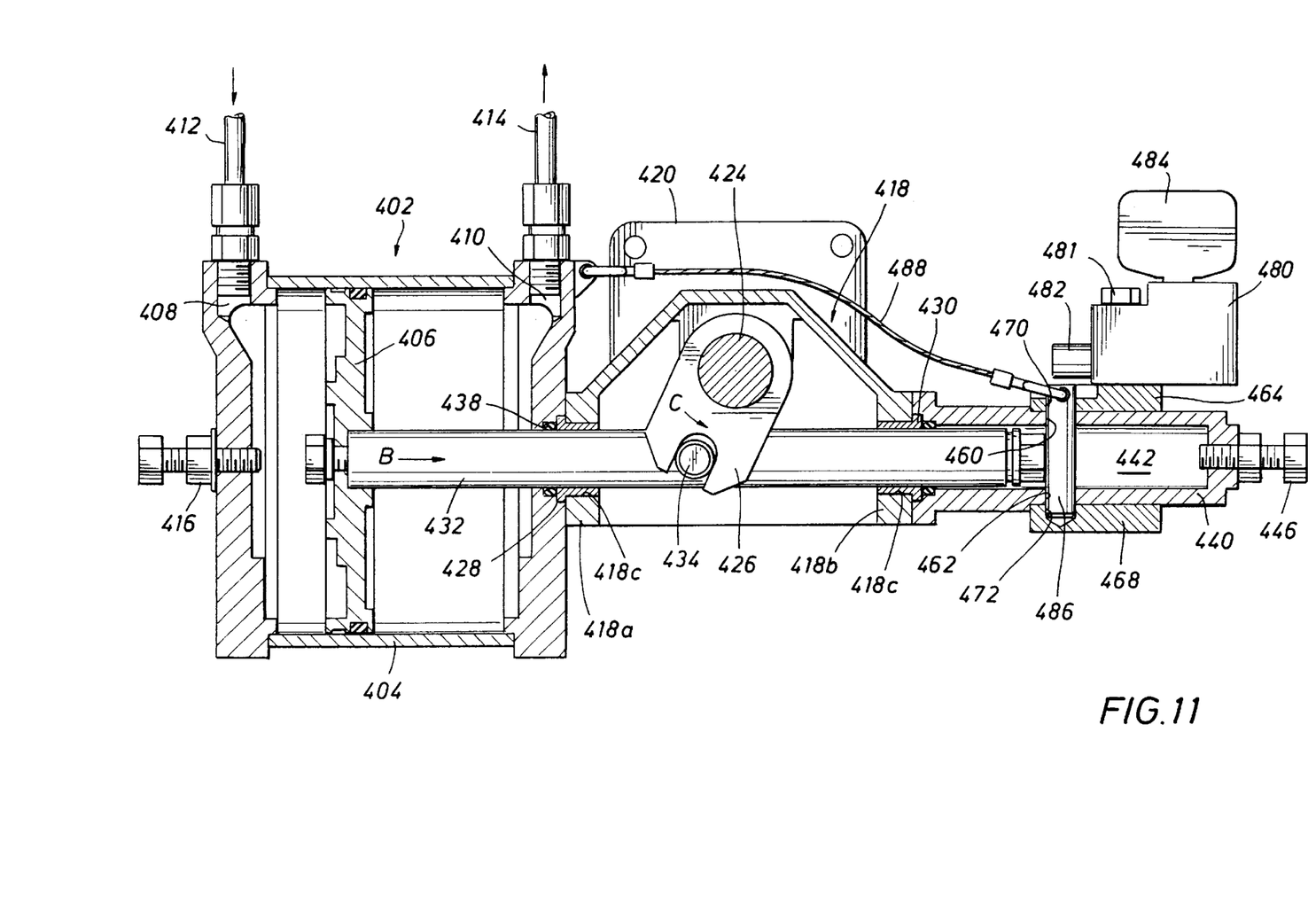
FIG. 11 is a view similar to FIG. 10 showing the stroke-limiting feature engaged.
Figure 12:
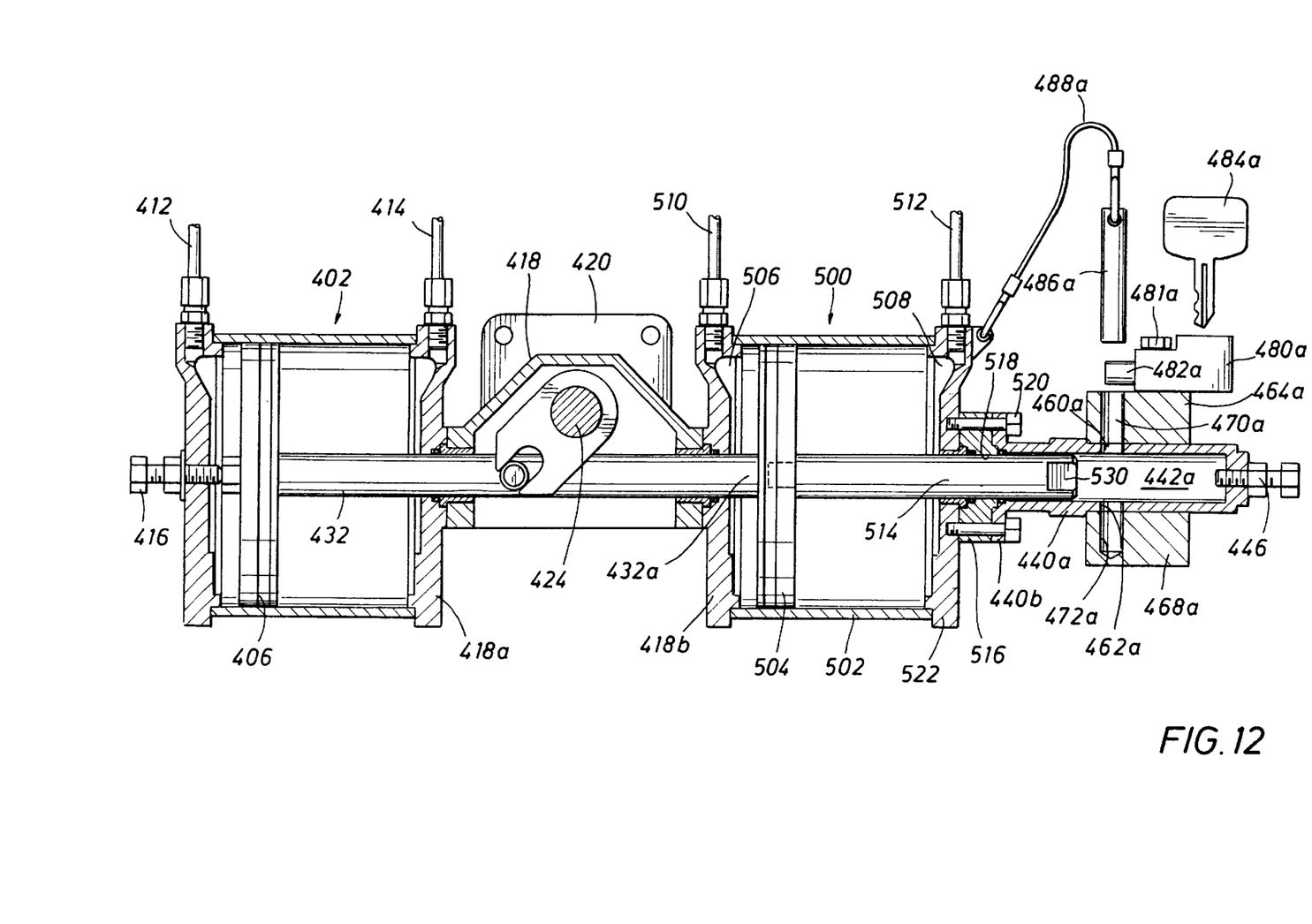
FIG. 12 is a view similar to FIG. 10 but showing the use of two prime movers.

Reference is now made to FIGS. 10–12 for an embodiment of the actuator assembly of the present invention having a stroke-limiting feature that permits a valve shaft or other driven member to which the actuator assembly is connected to be moved a limited, predetermined amount to test the movability or operability of the driven member, e.g., the valve shaft, and hence the valve element connected thereto.

With reference then to FIG. 10, the actuator assembly, shown generally as 400, comprises a prime mover 402 in the form of a fluid-activated actuator or motor having a cylindrical housing 404 and a cylindrical piston 406 slidably mounted in housing 404, piston 406 being movable in response to fluid pressure alternately forced into and out of ports 408 and 410 from a suitable pressure source (not shown), via lines 412 and 414. As in the case with the other actuator assemblies of the present invention, actuator 400 is provided with an adjustable stop 416 to limit the travel of piston 406 in housing 404.

Prime mover 402 is connected to a frame, shown generally as 418, frame 418 including a flange 420 provided with bolt holes 422 for securing flange 420 to the body of a valve or other apparatus containing a driven member by means of bolts (not shown). Rotatably journalled in frame 418, in the manner described above with respect to the actuator assemblies shown in FIGS. 1–9, is a driving shaft 424 that can be connected in a well-known manner to a driven member, such as the shaft of a valve or the like.

As is the case with the actuator assemblies shown in FIGS. 1–9, actuator assembly 400 is provided with a yoke assembly operatively connected to shaft 424, upper yoke piece 426 being shown.

Frame 418 includes a first end wall 418a and a second end wall 418b provided with bores 418c and 418d, respectively. Disposed in bores 418c and 418d are bearings 428 and 430, respectively. A cylindrical shaft 432 is slidably mounted in bearings 428 and 430 such that shaft 432 can reciprocate through first and second end walls 418a and 418b, respectively. Extending through a bore in and secured to shaft 432, is a drive pin 434, drive pin 434 being received in a slot 436 in yoke piece 426. As described above with respect to the other actuator assemblies, prime mover 402 is connected to end wall 418a in frame 418, an O-ring 438 serving to provide sealing between shaft 432 and prime mover 402. Accordingly, it will thus be seen that when fluid pressure is supplied to prime mover 402, as, for example, via port 408, piston 406 will be caused to move in the direction of arrow A, which will result in rotation of shaft 424. Conversely, when pressure is applied via port 410, piston 406 will be moved in the opposite direction until it contacts the stop 416. As described above, this reciprocal movement of shaft 432 is translated into rotational movement of shaft 426, which in turn results in rotation of a driven member, e.g., a valve stem, operatively attached in a suitable manner to shaft 424.

Attached to the other end wall 418b of frame 418 is a guide or housing 440, guide 440 forming a generally cylindrical passageway 442, passageway 442 being in register with bore 418d in end wall 418b. It will be understood that guide 440 is attached to frame 418 in the manner described above with respect to the embodiments shown in FIGS. 1–9. Guide 440 has an end wall 444 in which is disposed a stop 446, stop 446 being similar to stop 416. Since cylindrical passageway 42 is generally concentric with bores 418c and 418d, when piston 406 is caused to reciprocate in housing 404 as described above, the end 432a of rod 432 distal piston 406 will reciprocate or slidably move in cylindrical passageway 442. Once again, the degree of travel or stroke of shaft 432 in cylindrical passageway 442 will be determined by the setting of the stop 446. Indeed, in a typical situation, e.g., when actuator assembly 400 is being used to operate a valve, such as a quarter-turn valve, stops 416 and 446 are adjusted such that when stop 416 is contacted, the valve would be in a fully open position, whereas when stop 446 is engaged, the valve would be in a fully closed position.

As can be seen in the condition shown in FIG. 10, shaft 432 is free to reciprocate or stroke in cylindrical passageway 442 until it engages stop 446. In other words, assuming that engagement of stop 446 signals the fully closed position of the valve to which actuator assembly 400 is attached, the valve to which actuator assembly 400 is attached is in a condition where it can be moved from a fully open to a fully closed position.

Guide 440 is provided with a first bore 460 and a second bore 462, bores 460 and 462 being in register and transverse to cylindrical passage 442. Secured to guide 440 is a mount comprised of an upper mount section 464 and a lower mount section 468 suitably connected to one another by bolts (not shown) so as to encircle guide 440, which conveniently has a cylindrical outer surface. Formed in upper mount section 464 is a bore 470 that is in register, and hence concentric, with bores 460 and 462. There is also a blind bore 472 in lower mount section 468 that is likewise in register with bores 460 and 462.

Mounted on upper mount section 464 is a lock 480 having a bolt 482, lock 480 being operated by a key 484. Lock 480 is secured to upper mount section 464 by means of bolts 481. A pin 486 is loosely attached to prime mover 402 by means of a tether 488. Pin 486 has a diameter that approximates the ID of the bores 470, 460, 462, and 472 and can be received in such bores for a purpose hereinafter described. It will be appreciated that in the condition of the actuator assembly 400 shown in FIG. 10, pin 486 can be inserted into the bores 470, 460, 462, and 472, and since in that position it will extend transverse to cylindrical passageway 442, movement of shaft 432 in cylindrical passageway 442 will be limited, a condition that is depicted in FIG. 11.

As can be seen in FIG. 11, with pin 486 in place in the registering bores such that it is disposed transverse to cylindrical passageway 442, shaft 432 can move in the direction of arrow B for only a limited amount away from stop 416. Accordingly, with fluid supplied through port 408, piston 406 will be moved in the direction of arrow B, which will move shaft 432 in the direction of arrow B, and yoke section 426 will rotate in the direction of arrow C a limited, predetermined amount from the position shown in FIG. 10. In effect, and in a case wherein shaft 424 would be interconnected to a valve stem, which in turn would be connected to a valve element, and assuming that in the position shown in FIG. 10, the valve element would be in the fully open position, the valve element would now be moved a small, predetermined amount toward the closed position but could not be moved to a fully closed position because the stroke of shaft 432 is limited by pin 486. It will be recognized that by reversing the flow of fluid through ports 408 and 410, the valve could be moved back and forth a small, predetermined amount to "exercise" the valve and ensure that the valve was operable—i.e., that if it were an ESV, actuator assembly 400 would be able to move the valve element to the fully closed position in the event of an emergency.

As can also be seen from FIG. 11, the length of pin 486 is such that when it is received in the registering bores, and upon activation by key 484, bolt 482 can be moved to a position where it overlies bores 470,460,462, and 472 and consequently will overlie pin 486. Thus, during the exercising operation, lock 480 can be used to ensure that pin 486 is not removed and accordingly that the shaft 432 is not allowed to move to a position where it engages stop 446, which would typically close the valve. Once the exercising procedure has been completed, bolt 482 can be retracted using key 484, pin 486 removed from guide 440, and the valve to which actuator 400 is attached will now be capable of moving to the fully closed position in the case of an emergency.

With reference now to FIG. 12, there is shown another embodiment of the actuator assembly of the present invention used as a stroke-limiting device. The actuator assembly shown in FIG. 12 differs from that shown in FIG. 10, primarily in the use of two prime movers—i.e., prime mover 402 and prime mover 500. Whereas prime mover 402 is attached to end wall 418a of frame 418, prime mover 500 is attached to end wall 418b of frame 418. Prime mover 500 has a cylindrical housing 502 in which is disposed a cylindrical piston 504, piston 504 being attached to one end of shaft 432. As in the case of prime mover 402, prime mover 500 is provided with ports 506 and 508 through which a source of fluid pressure (not shown) can be alternatively supplied and exhausted via lines 510 and 512. A shaft extension 514 is threadedly received (as shown in phantom lines) in piston 504 and accordingly, can reciprocate in housing 502 in response to reciprocation of piston 504 in the manner described above with respect to the movement of piston 406. Extension shaft 514 is provided with wrench flats 530, which permit extension shaft 514 to be threaded into a threaded bore in end 432a of shaft 432. Guide 440a, having a cylindrical passageway 442a, is secured to prime mover 500 via an adapter block 516 having a central bore 518 through which extension shaft 514 passes. Bolts 520 are received in a flange 440b of guide 440a and secure guide 440a and adapter block 516 to an end wall 522 of prime mover 500. As in the case with the actuator assembly shown in FIGS. 10 and 11, when key 484a is received in lock 480a to retract bolt 482a, pin 486a may then be received in registering bores 470a, 460a, 462a, and 472a to limit the stroke of shaft extension 514 in cylindrical passage 442a and hence limit the movement of driving shaft 424.

While the above invention has been described with respect to the block being in the form of a keyed lock having a throw bolt that can be retracted and extended from the housing of the lock to control access to the bores in the guide, it is to be understood that the lock could be a combination lock or any other type of lock or latch that permits selective access. Furthermore, other types of blocks could be employed to control access to the bores in the guide and hence permit selective insertion and/or retraction of the pin, e.g., pin 486 or 486a. For example, the guide, e.g., guide 440, could be provided with a sleeve slidably movable on the exterior surface of the guide from a position wherein the bores in the guide where accessible to a position wherein the sleeve prevented insertion of the pin. In such a case, the mount could be dispensed with. Again, a suitable locking mechanism to prevent unauthorized movement of the sleeve would be provided.

It is also to be understood that while a pin has been described as a part of the locking or stroke-limiting mechanism of the actuator assemblies of the present invention, other members could be employed. In general, any member that can be operatively attached to the guide and can engage the shaft or shaft extension of any of the actuator assemblies shown in FIGS. 1–9 to prevent movement of the shaft or that can limit longitudinal movement of the shaft or shaft extension in the guide to a predetermined amount with respect to the actuator assemblies shown in FIGS. 10–12 can be employed. Thus, any member that would lock the shaft of the actuator to the guide to prevent relative movement therebetween or would interfere with the travel of the shaft in the guide and thereby limit the stroke of the shaft can be employed.

While the present invention has been described above with respect to the prime mover being of the fluid-operated piston type, it is to be understood that it is applicable to other actuator assemblies and other types of actuators such as rack and pinion actuators, electric actuators, mechanical actuators, and hydraulic actuators. Such actuators can be manually operated, e.g., a manual override can be provided on the actuator, which allows the actuator to be operated by a worker. Also, the actuator can be of a type that is inherently manually operated by a worker. In general, the actuator assembly of the present invention can be used in any actuator system that involves a reciprocating shaft that is driven by a prime mover and that in turn is connected by a suitable linkage that is used to move a driven member, either linearly or rotatably.

The foregoing description and examples illustrate selected embodiments of the present invention. In light thereof, variations and modifications will be suggested to one skilled in the art, all of which are in the spirit and purview of this invention.

What is claimed is:

1. An actuator assembly comprising:

at least one prime mover;

a shaft having a first end and a second end, said shaft being operably connected to said prime mover for longitudinal, reciprocal movement;

a frame, said shaft being reciprocably movable in said frame;

a linkage attached to said frame and operably connected to said shaft, said linkage being movable between a first position and a second position in response to reciprocal movement of said shaft;

a selectively engageable locking assembly operatively connected to said shaft, said locking assembly preventing movement of said shaft when said shaft is in a predetermined position, and an adjustment assembly operatively connected to said shaft, said adjustment assembly being selectively adjustable to determine said predetermined position.

2. The actuator assembly of claim 1 wherein said first end of said shaft is connected to said at least one prime mover, said actuator assembly further comprising:

a shaft extension, said shaft extension having a first end and a second end, said first end of said shaft extension being operably connected to said second end of said shaft for movement with said shaft;

a guide having a first end and a second end, said shaft extension being slidably moveable in said guide, said first end of said guide being connected to said frame.

3. The actuator assembly of claim 2, further including a tubular housing having a first end and a second end, said first end of said housing being attached to the second end of said guide, and being longitudinally adjustable with respect to said guide, said shaft extension having a transverse bore therethrough, said housing having at least one hole in register with said bore in said shaft extension when said shaft is in said predetermined position and a pin selectively received in said bore and said registering hole.

4. The actuator assembly of claim 3 wherein said housing has first and second holes, both of said holes being in register with said bore in said shaft extension, said pin extending through said registering holes and said bore.

5. The actuator assembly of claim 4 wherein said pin has a first portion preventing movement of said pin through said registering holes and said bore and a second portion adapted to receive a selectively engageable lock for preventing said pin from being removed from said housing and said shaft extension.

6. The actuator assembly of claim 4 wherein said second end of said shaft extension includes an indicator for indicating whether said linkage is in said first or second position.

7. The actuator assembly of claim 6 wherein said second end of said housing has an axially facing bore and said indicator comprises a protrusion extending axially from said second end of said shaft extension, said protrusion projecting out of said axially facing bore in said housing when said linkage is in said first position.

8. The actuator assembly of claim 3 wherein said first end of said housing is threadedly received in said second end of said guide.

9. The actuator assembly of claim 1 wherein said prime mover comprises a fluid-operated actuator.

10. The actuator assembly of claim 1 wherein said frame is adapted to be secured to a valve housing.

11. The actuator assembly of claim 1 wherein said linkage is rotatable between said first and second positions.

12. The actuator assembly of claim 1 wherein there are first and second prime movers, said first end of said shaft being connected to said first prime mover, said second end of said shaft being connected to said second prime mover.

13. An actuator assembly comprising;
  at least one prime mover;
  a shaft having a first section and a second section, such shaft being operably connected to said prime mover for longitudinal, reciprocal movement between first and second, axially spaced locations;
  a frame, said shaft being reciprocally movable in said frame;
  a linkage attached to said frame and operably connected to said shaft, said linkage being movable between a first position and a second position in response to reciprocal movement of said shaft;
  a stop selectively engageable with said second portion of said shaft, said stop preventing movement of said shaft to said second location when said stop engages said second section of said shaft; and
  a blocking assembly operatively connected to said stop, said blocking assembly being selectively actuatable to prevent engagement between said second section of said first shaft and said stop.

14. The actuator assembly of claim 13 wherein said first section said shaft is connected to said at least one prime mover, said actuator assembly further comprising:
  a guide connected to said frame, said second section of said shaft being slidably movable in said guide.

15. The actuator assembly of claim 14 wherein said guide defines a passageway, said second section of said shaft being movable in said passageway, there being a first bore in said guide in open communication with said passageway and there is a selectively removable stop insertable in said first bore to prevent movement of said shaft in said passageway where said stop is inserted in said first bore.

16. The actuator assembly of claim 15 wherein there is a second bore in said guide, said first and second bores being in register and transverse to said passageway and said stop is receivable in said first and second bores.

17. The actuator assembly of either of claims 15 or 16 wherein said stop comprises a pin.

18. The actuator assembly of claim 16 wherein said passageway is generally cylindrical.

19. The actuator assembly of claim 16 wherein there is a block selectively actuatable to prevent insertion of said pin in said first bore.

20. The actuator assembly of claim 16 wherein said block is selectively actuatable to prevent said pin from being removed from said guide when said pin is received in said guide.

21. The actuator assembly of either of claim 14 wherein said blocking assembly is secured to said guide.

22. The actuator assembly of claim 21 wherein said blocking assembly comprises the bolt of a lock.

23. The actuator assembly of claim 22 wherein said lock is keyed.

24. The actuator assembly of claim 22 wherein there is a mount secured to said guide, said mount having a third bore in register with said first bore, said stop being receivable through said third bore.

25. The actuator assembly of claim 24 wherein said mount comprises first and second block sections, said first section being secured to said second section in surrounding relationship to said guide.

26. The actuator assembly of claim 25 wherein said third bore is in said first block section.

27. The actuator assembly of claim 26 wherein said lock is secured to said first block section.

28. The actuator assembly of claim 13 wherein there are first and second prime movers, said first portion of said shaft being connected to said first prime mover, said second portion of said shaft being connected to said second prime mover.

29. The actuator assembly of claim 28 further including:
  a shaft extension having a first end and a second end, said first end of said shaft extension being operably connected to said second shaft section for movement with said shaft; and
  a guide having a first end and a second end, said shaft extension being slidably moveable in said guide, said first end of said guide being connected to said second prime mover.

30. The actuator assembly of claim 29 wherein said guide defines a passageway, said shaft extension being moveable in said passageway, there being a first bore in said guide in open communication with said passageway and there is a selectively removable stop insertable in said first bore to limit movement of said shaft in said passageway when said stop is inserted in said first bore.

31. The actuator assembly of claim 30 wherein there is a second bore in said guide, said first and second bores being in register and transverse to said passageway and said stop is receivable in said first and second bores.

32. The actuator assembly of either of claims 30 or 31 wherein said stop comprises a pin.

33. The actuator assembly of claim 31 wherein said passageway is generally cylindrical.

34. The actuator assembly of claim 29 wherein said blocking assembly is secured to said guide.

35. The actuator assembly of claim 34 wherein said blocking assembly comprises the bolt of a lock.

36. The actuator assembly of claim 35 wherein said lock is keyed.

37. The actuator assembly of claim 36 wherein there is a mount secured to said guide, said mount having a third bore and register with said first bore, said stop being a receivable through said third bore.

38. The actuator assembly of claim 37 wherein said mount comprises first and second block sections, said first section being secured to said second section in surrounding relationship to said guide.

39. The actuator assembly of claim 38 wherein said third bore is in said first block section.

40. The actuator assembly of claim 38 wherein said lock is secured to said first block section.

41. An actuator assembly comprising:
at least one prime mover;
a shaft having a first section and a second section, said shaft being operably connected to said prime mover for longitudinal, reciprocal movement;
a frame, said shaft being reciprocally moveable in said frame;
a linkage attached to said frame and operably connected to said shaft, said linkage being moveable between a first position and a second position in response to said reciprocal movement of said shaft;
a selectively engageable locking assembly operatively connected to said shaft, said locking assembly being operable to prevent movement of said shaft when said shaft is in a predetermined position;
a guide having a first and a second end, said shaft being slidably mounted in said guide, said first end of said guide being connected to said frame; and
a tubular housing having a first end and a second end, said first end of said housing being attached to said second end of said guide and being longitudinally adjustable with respect to said guide, said locking assembly being operable to selectively interconnect said housing and said shaft.

42. The actuator assembly of claim 41 further including a shaft extension having a first end and a second end, said first end of said shaft extension being operably connected to said second section of said shaft for movement with said shaft.

43. The actuator assembly of claim 42 wherein said shaft extension has a transverse bore therethrough, said housing having at least one hole in register with said bore in said shaft extension when said shaft is in said predetermined position and a pin selectively received in said bore and said registering hole.

44. The actuator assembly of claim 43 wherein said housing has first and second holes, both of said holes being in register with said bore in said shaft extension, said pin extending through said registering holes and said bore.

45. The actuator assembly of claim 44 wherein said pin has a first portion preventing movement of said pin through said registering holes and said bore and a second portion adapted to receive a selectively engageable lock for preventing said pin from being removed from said housing and said shaft extension.

46. The actuator assembly of claim 42 wherein said second end of said shaft extension includes an indicator for indicating whether said linkage is in said first or second position.

47. The actuator assembly of claim 46 wherein said second end of said housing has an axially facing bore and said indicator comprises a protrusion extending axially from said second end of said shaft extension, said protrusion projecting out of said axially facing bore in said housing when said linkage is in said first position.

48. The actuator assembly of claim 41 wherein said prime mover comprises a fluid-operated actuator.

49. The actuator assembly of claim 41 wherein said first end of said housing is threadedly attached to said second end of said guide.

50. The actuator assembly of claim 41 wherein said frame is adapted to be secured to a valve housing.

51. The actuator assembly of claim 41 wherein said linkage is rotatable between said first and second positions.

52. An actuator assembly comprising:
first and second prime movers;
a frame interconnecting said first and second prime movers;
a shaft having first and second shaft sections, said first shaft section being connected to said first prime mover, said second shaft section being connected to said second prime mover, said shaft being reciprocally movable in said frame;
a linkage attached to said frame and operably connected to said shaft, said linkage being movable between a first position and a second position in response to said reciprocal movement of said shaft;
a first, selectively engageable locking assembly operatively connected to said first shaft section, said first locking assembly preventing movement of said shaft when said shaft is in a first predetermined position;
a first guide having a first end and a second end, said first end of said first guide being connected to said first prime mover distal said frame, said first shaft section being slidably mounted in said first guide;
a first tubular housing having a first end and a second end, said first end of said first tubular housing being attached to said second end of said first guide and being longitudinally adjustable with respect to said first guide, said first locking assembly being operable to selectively interconnect said first housing and said first shaft section;
a second selectively engageable locking assembly operatively connected to said second shaft section, said second locking assembly preventing movement of said shaft when said shaft is in a second predetermined position;
a second guide having a first end and a second end, said first end of said second guide being connected to said second prime mover distal said frame, said second shaft section being slidably mounted in said second guide; and
a second tubular housing having a first end and second end, said first end of said second tubular housing being attached to said second end of said second guide and being longitudinally adjustable with respect to said second guide, said second locking assembly being operable to selectively interconnect said second housing and said second shaft section.

53. The actuator assembly of claim 52 wherein said first end of said first housing is threadedly attached to said second end of said first guide and said first end of said second housing is threadedly attached to said second end of said second guide.

54. The actuator assembly of claim 53 wherein said first shaft section includes a first indicator for indicating whether said linkage is in said first position and said second shaft section includes a second indicator for indicating whether said linkage is in said second position.

55. The actuator assembly of claim 54 wherein said second ends of said first and second housings have axially facing bores and said first and second indicators comprise first and second protrusions extending axially from the ends of said first and second shaft sections, respectively, said first protrusion projecting out of said axially facing bore in said first housing when said linkage is in a first position, said second protrusion projecting out of the said axially facing bore in said second housing when said linkage is in said second position.

56. The actuator assembly of claim 52 wherein said linkage is rotatable between first and second positions.

57. The actuator assembly of claim 52 wherein said first and second prime movers comprise fluid operated actuators.

58. The actuator assembly of claim 52 wherein said first shaft section has a transverse bore therethrough, said first housing having at least hole in register with said bore in said first shaft section when said shaft is in a first predetermined position and wherein said second shaft section has a transverse bore therethrough, said second housing having at least hole in register with said bore in said second shaft section when said shaft is in a second predetermined position, and a pin being selectively received in one of said bores and registering holes.

59. The actuator assembly of claim 58 wherein said first housing has first and second holes, both of said holes being in register with said bore in said first shaft section and said second housing has first and second holes, both of said holes being in register with said bore in said second shaft section.

60. An actuator assembly comprising:

first and second prime movers;

a frame interconnecting said first and second prime movers;

a shaft having first and second shaft sections, said first shaft section being connected to said first prime mover, said second shaft section being connected to said second prime mover, said shaft being reciprocally movable in said frame;

a linkage attached to said frame and operably connected to said shaft, said linkage being movable between a first position and a second position in response to said reciprocal movement of said shaft;

a selectively engageable locking assembly operatively connected to said second shaft section, said locking assembly preventing movement of said shaft when said shaft is in a predetermined position;

a guide having a first end and a second end, said first end of said guide being connected to said second prime mover distal said frame, said second shaft section being slidably mounted in said guide;

a tubular housing having a first end and a second end, said first end of said tubular housing being attached to said second end of said guide and being longitudinally adjustable with respect to said guide, said locking assembly being operable to selectively interconnect said housing and said second shaft section.

61. The actuator assembly of claim 60 wherein said housing is threadedly attached to said second end of said guide.

62. The actuator assembly of claim 61 wherein said second shaft section includes an indicator for indicating whether said linkage is in said first or second position.

63. The actuator assembly of claim 62 wherein said second end of said housing has an axially facing bore and said indicator comprises a protrusion extending axially from the end of said second shaft section, said protrusion projecting out of said axially facing bore in said housing when said shaft is in said predetermined position.

64. The actuator assembly of claim 60 wherein said first and second prime movers comprise fluid operated actuators.

65. The actuator assembly of claim 60 wherein said second shaft section has a transverse bore therethrough, said housing having at least one hole in register with said bore in said second shaft section when said shaft is in said predetermined position, and a pin being selectively received in said bore and said registering hole.

66. The actuator assembly of claim 65 wherein said housing has first and second holes, both of said holes being in register with said bore in said second shaft section.

* * * * *